United States Patent
Bordet et al.

(10) Patent No.: US 9,395,028 B2
(45) Date of Patent: Jul. 19, 2016

(54) METHOD FOR FINISHING A TUBULAR THREADED MEMBER WITH A DRY PROTECTION COATING

(71) Applicants: Vallourec Oil and Gas France, Aulnoye-Aymeries (FR); Nippon Steel & Sumitomo Metal Corporation, Chiyoda-ku (JP)

(72) Inventors: Laurent Bordet, Lille (FR); Laurent Gillot, Valenciennes (FR); Eliette Pinel, Sainte-Euphemie (FR); Eric Gard, Sathonay Village (FR)

(73) Assignees: VALLOUREC OIL AND GAS FRANCE, Aulnoye-Aymeries (FR); NIPPON STEEL & SUMITOMO METAL CORPORATION, Chiyoda-ku (JP)

( * ) Notice: Subject to any disclaimer, the term of this patent is extended or adjusted under 35 U.S.C. 154(b) by 0 days.

(21) Appl. No.: 14/316,351

(22) Filed: Jun. 26, 2014

(65) Prior Publication Data

US 2014/0308455 A1    Oct. 16, 2014

Related U.S. Application Data

(62) Division of application No. 12/595,554, filed as application No. PCT/FR2007/000627 on Apr. 13, 2007.

(51) Int. Cl.
*F16L 58/04* (2006.01)
*C10M 169/04* (2006.01)
(Continued)

(52) U.S. Cl.
CPC ............ *F16L 58/04* (2013.01); *C10M 169/044* (2013.01); *C23C 4/02* (2013.01); *C23C 4/124* (2013.01); *C23C 4/129* (2016.01); *C23C 22/76* (2013.01); *E21B 17/042* (2013.01); *F16L 15/001* (2013.01); *F16L 58/182* (2013.01); *C10M 2201/061* (2013.01); *C10M 2201/065* (2013.01); *C10M 2201/066* (2013.01); *C10M 2205/022* (2013.01); *C10M 2205/14* (2013.01);
(Continued)

(58) Field of Classification Search
USPC ........................................................ 427/299
See application file for complete search history.

(56) References Cited

U.S. PATENT DOCUMENTS 2,490,949 A    12/1949    De Lorenzo
3,390,800 A    7/1968    Simons
(Continued)

FOREIGN PATENT DOCUMENTS

EP    1 211 451    6/2002
EP    1 258 513    11/2002
(Continued)

OTHER PUBLICATIONS

U.S. Appl. No. 14/369,345, filed Jun. 27, 2014, Gard, et al.

*Primary Examiner* — Nathan T Leong
(74) *Attorney, Agent, or Firm* — Oblon, McClelland, Maier & Neustadt, L.L.P.

(57) ABSTRACT

A tubular threaded element including a dry protective coating. The coating includes a solid matrix adhering to the substrate in which there are dispersed particles of at least one solid lubricant belonging to one and the same class. The solid matrix is lubricating and has a rheological behavior of plastic or viscoplastic type. The coating protects the threadings of the threaded elements, used for example in hydrocarbon wells, from corrosion and galling.

17 Claims, 2 Drawing Sheets

(51) Int. Cl.
  *E21B 17/042* (2006.01)
  *F16L 15/00* (2006.01)
  *F16L 58/18* (2006.01)
  *C23C 4/02* (2006.01)
  *C23C 4/12* (2016.01)
  *C23C 22/76* (2006.01)

(52) U.S. Cl.
  CPC ... *C10M2207/026* (2013.01); *C10M 2209/084* (2013.01); *C10M 2213/062* (2013.01); *C10M 2215/066* (2013.01); *C10M 2217/044* (2013.01); *C10M 2219/044* (2013.01); *C10M 2223/04* (2013.01); *C10M 2229/02* (2013.01); *C10N 2220/082* (2013.01); *C10N 2230/06* (2013.01); *C10N 2230/12* (2013.01); *C10N 2240/06* (2013.01); *C10N 2250/10* (2013.01); *C10N 2250/14* (2013.01); *C10N 2250/141* (2013.01)

(56) References Cited

U.S. PATENT DOCUMENTS

| | | | |
|---|---|---|---|
| 3,573,111 A * | 3/1971 | Thurston | 428/328 |
| 4,414,247 A | 11/1983 | Hübecker et al. | |
| 4,630,849 A | 12/1986 | Fukui et al. | |
| 5,855,963 A * | 1/1999 | Urbanek et al. | 427/448 |
| 6,027,145 A | 2/2000 | Tsuru et al. | |
| 6,233,998 B1 | 5/2001 | Tseng | |
| 6,635,341 B1 | 10/2003 | Barancyk et al. | |
| 6,679,526 B2 | 1/2004 | Yamamoto et al. | |
| 6,695,012 B1 | 2/2004 | Ring et al. | |
| 6,827,996 B2 * | 12/2004 | Goto | 428/36.9 |
| 6,933,264 B2 | 8/2005 | Petelot | |
| 7,014,694 B1 | 3/2006 | Miksic et al. | |
| 8,673,828 B2 | 3/2014 | Pinel et al. | |
| 8,735,334 B2 | 5/2014 | Pinel et al. | |
| 2003/0066641 A1 | 4/2003 | Yamamoto et al. | |
| 2003/0094810 A1 | 5/2003 | Goto et al. | |
| 2003/0144158 A1 | 7/2003 | Petelot | |
| 2004/0166341 A1 | 8/2004 | Iwata et al. | |
| 2004/0195825 A1 * | 10/2004 | Anraku et al. | 285/94 |
| 2004/0239105 A1 | 12/2004 | Matsumoto et al. | |
| 2004/0260001 A1 | 12/2004 | Lin et al. | |
| 2005/0176592 A1 | 8/2005 | Calvo et al. | |
| 2009/0220780 A1 | 9/2009 | Bordet et al. | |
| 2012/0169048 A1 | 7/2012 | Pinel et al. | |
| 2012/0312527 A1 | 12/2012 | Pinel et al. | |
| 2013/0193682 A1 | 8/2013 | Gard et al. | |
| 2013/0221660 A1 | 8/2013 | Pinel et al. | |
| 2013/0320665 A1 | 12/2013 | Gard et al. | |
| 2013/0333790 A1 | 12/2013 | Pinel et al. | |
| 2014/0238661 A1 | 8/2014 | Gard et al. | |

FOREIGN PATENT DOCUMENTS

| | | |
|---|---|---|
| EP | 1 411 288 | 4/2004 |
| WO | 96 20083 | 7/1996 |
| WO | WO 2004/033951 | 4/2004 |
| WO | WO2006075774 * | 7/2006 |
| WO | WO 2013/098490 A1 | 7/2013 |
| WO | WO 2014/041017 A1 | 3/2014 |
| WO | WO 2014/044583 A1 | 3/2014 |

* cited by examiner

METHOD FOR FINISHING A TUBULAR THREADED MEMBER WITH A DRY PROTECTION COATING

CROSS-REFERENCE TO RELATED APPLICATIONS

This application is a divisional of U.S. application Ser. No. 12/595,554 filed Jan. 14, 2010, the entire content of each of which is incorporated herein by reference. U.S. application Ser. No. 12/595,554 is also based upon International Application No. PCT/FR07/000627 filed Apr. 13, 2007.

The invention concerns a threaded element for a tubular threaded joint.

STATE OF THE ART

The threaded elements provided at the end of a tubular component (tube or coupling) and used in hydrocarbon wells firstly have to be protected from corrosion during transport and storage on the drilling site and for that they are traditionally coated with protective oils or greases on leaving the manufacturing workshop.

Figure 1:
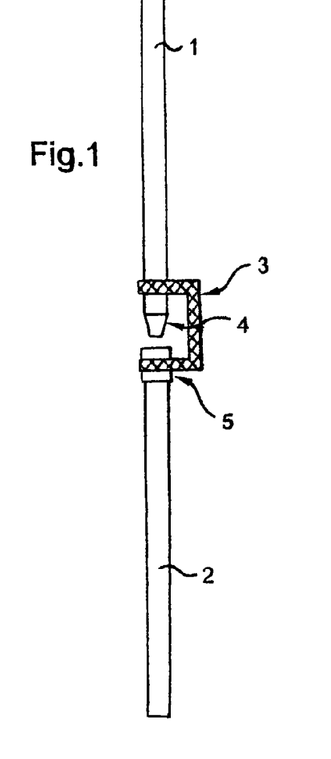
FIG. 1 diagrammatically shows two tubes ready to be assembled by makeup of their threaded elements in a hydrocarbons well.

At the well they may have to undergo several makeup and breakout cycles. The makeup operations are carried out vertically under a high axial load, for example under the weight of a tube of several meters in length (typically 10 to 13 meters in length) which is to be assembled by the threaded joint vertically, and that gives rise to risks of galling, in particular of the threadings. That load can also be localised by slight misalignment of the axis of the threaded elements to be assembled because the tube to be assembled is suspended vertically, which increases the risk of galling. Thus FIG. 1 shows the procedure for assembly by means of a threaded joint of two tubes 1 and 2 which are 10 to 13 meters in length on the building site with a misalignment, power tongs 3 being used to make up the male threaded portion 4 of the tube 1 into the female threaded portion 5 of the tube 2.

To protect the delicate parts such as the threadings from galling in makeup and breakout operations the threadings are traditionally freed from protective grease and coated with special makeup greases such as the grease in accordance with API Bul. 5A2 or RP5A3. The use of such greases which are charged with heavy and/or toxic metals such as lead, besides the disadvantage of requiring a second coating operation at the well, involves the disadvantage of causing pollution of the wells and the environment, the excess of grease being expelled from the threadings in the makeup operation.

U.S. Pat. No. 6,933,264 proposes replacing the double coating operation by a single coating operation which is implemented at the workshop where the threaded elements are produced, using a thin layer of a lubricant of waxy consistency (referred to as semi-dry), comprising at least one extreme-pressure additive with a chemical action. Such a semi-dry coating however suffers from the disadvantage of requiring mechanical protection from pollution by particles of dust or sand during transport and storage.

U.S. Pat. No. 4,414,247, U.S. Pat. No. 4,630,849, U.S. Pat. No. 6,027,145, U.S. Pat. No. 6,679,526 B2, US No 2004/0166341 A1 and WO 2004/033951 propose replacing the greases by various protective coatings in the solid state which are applied in the workshop where the threaded elements are manufactured, comprising a solid matrix which adheres to the substrate and in which are dispersed particles of solid lubricants among which molybdenum disulphide $MoS_2$ is more particularly mentioned.

Although those coatings represent an improvement in comparison with the greases, the coatings are still not entirely satisfactory. In particular, under the drilling site conditions, it is frequently found that the coating flakes off and/or particles are torn from the rubbing surface thereof and dispersed in the environment, those incidents requiring the tubular component to be returned to the factory.

In addition those coatings generally necessitate hardening induced by heating in a furnace at about 200° C. for several tens of minutes or indeed more than an hour, which considerably adds to the coating production cycle, which cannot be in line with the machining of the threadings.

In addition they generally do not protect the threaded elements from corrosion, or do not protect them sufficiently, so that U.S. Pat. No. 6,679,526 B2 and WO 2004/033951 provide for the application of a separate layer of a corrosion-inhibiting material (a metal salt of carboxylic acid for the first document, and epoxy resin containing zinc particles for the second document).

Such a double-layer coating necessitates even more cumbersome production cycles and still does not resolve the problem of particles being torn off.

The aim of the invention is to remedy the disadvantages of the known dry or semi-dry coatings and greases and thus to improve the situation as regards tribology and productivity of the application of the coating.

Optionally the invention aims to improve the situation as regards corrosion of the threaded elements.

Makeup under working conditions, in particular under building site conditions, means makeup operation which is generally carried out in a vertical position, in which (i) a first threaded element is held vertically and fixed, and (ii) a second threaded element which is to be made up onto the first threaded element, disposed at or fixed to the lower end of a tube which may be 13 meters long, is held substantially vertically above the first threaded element by a lifting apparatus, the second threaded element then being made up into the first using a suitable device such as motor-driven power tongs. Likewise breakout under building site conditions means breakout of the first and second threaded elements which are disposed vertically and thus supporting the weight of a tube and subject to possible misalignment, the tube which is to be broken out being suspended from a lifting apparatus.

The invention concerns in particular a threaded element for a tubular threaded joint which is resistant to galling, comprising a threading covered with a thin coating in the solid state, not sticky to the touch and adhering to the substrate, which comprises a solid matrix and, in said matrix, a dispersion of particles of at least one solid lubricant.

According to the invention the solid matrix is lubricating and presents a Theological behaviour of the plastic or viscoplastic type.

In accordance with an embodiment the dispersion of particles of at least one solid lubricant comprises particles of lubricant of a single one of classes 1, 2, 3 or 4.

In accordance with another embodiment of the invention the solid matrix comprises at least one thermoplastic polymer and debris re-agglomeration means capable of re-agglomerating the debris formed in the vicinity of the surface of said threaded element by friction.

Optional features of the invention, being additional or alternative features, are set forth hereinafter:

the matrix has a melting point of between 80 and 320° C.;
the thermoplastic polymer is polyethylene;
the matrix comprises at least one metallic soap;
the soap is zinc stearate;

the matrix comprises at least one wax of vegetable, animal, mineral or synthetic origin;

the wax is carnauba wax;

the matrix comprises at least one corrosion inhibitor;

the corrosion inhibitor is a derivative of calcium sulphonate;

the soap is selected to improve the time for the appearance of corrosion in the saline mist test in accordance with standard ISO 9227;

the matrix comprises at least one liquid polymer of a kinematic viscosity at 100° C. which is at least equal to 850 mm$^2$/s;

the liquid polymer is water-insoluble;

the liquid polymer is selected from an alkyl polymethacrylate, a polybutene, a polyisobutene and a polydialkylsiloxane;

the matrix comprises at least one surface-active agent;

the matrix comprises at least one colouring agent;

the matrix comprises at least one anti-oxidant;

the particles of solid lubricants comprise particles of at least one solid lubricant of class 1;

the particles of solid lubricants are selected from particles of lubricant of class 1, excluding graphite particles;

the particles of solid lubricants comprise particles of at least one solid lubricant of class 1 selected from boron nitride and zinc oxide;

the particles of solid lubricants comprise particles of at least one solid lubricant of class 2;

the particles of solid lubricants are selected from particles of lubricant of class 2 excluding particles of molybdenum disulphide;

the particles of solid lubricants comprise particles of at least one solid lubricant of class 2 selected from graphite fluoride, tin sulphides and bismuth sulphides;

the particles of solid lubricants comprise particles of at least one solid lubricant of class 4; and the particles of solid lubricants comprise particles of at least one solid lubricant of class 4 selected from polytetrafluoroethylene and polyamide-11.

The invention also concerns a tubular threaded joint comprising a male threaded element and a female threaded element characterised in that one at least of said threaded elements is as defined hereinbefore, and a process for finishing a tubular threaded element, wherein there is applied at least to the surface of the threading a solid anti-galling coating in the form of a thin layer as defined hereinbefore after having subjected the surface to be coated to a surface treatment for improving the adhesion of the coating.

The process according to the invention may comprise at least some of the following particularities:

the constituents of the coating are raised to a temperature higher than the melting temperature of the matrix and then the coating is applied by spraying of said constituents comprising the matrix in the molten state;

the coating is applied by projection through a flame of a powder formed by the constituents of the coating;

the coating is applied by spraying an aqueous emulsion in which the constituents of the coating are dispersed;

the threaded element is raised to a temperature higher than or equal to 80° C.;

the threaded element is at ambient temperature;

said surface treatment is selected from mechanical treatments, chemical treatments and non-reactive deposits;

the surface to be coated is a metallic surface and said surface treatment is a treatment for chemical conversion of said surface;

said chemical conversion treatment is a phosphatation process;

said surface treatment is followed by a treatment for impregnation of the roughness or the porosities of the surface to be coated (12) with nanomaterials (11) with an anti-corrosion action;

said nanomaterials are particles (11) of zinc oxide;

said nanomaterials are of a median particle size of the order of 200 nm; and said nanomaterials are applied in the form of a dispersion.

The features and advantages of the invention are set forth in greater detail in the description hereinafter with reference to the accompanying drawings.

The invention concerns a threaded element for a tubular threaded joint which is resistant to galling. The threaded element is provided with a threading covered with a thin coating in the solid state, not sticky to the touch and adhering to the substrate, which withstands numerous makeup and breakout operations.

The coating of the threaded element comprises a solid matrix and at least one solid lubricant composed of particles which are dispersed in the solid matrix.

The invention is based on a study of the tribological behaviour of certain materials and refers to certain notions which are set forth hereinafter.

Base Notions

Solid Lubricant Transfer Film Effect or Leafing Effect

Solid lubricants in a dry-state hydrodynamic lubrication condition, when dispersed in a fluid or viscoplastic material, have a tendency to become fixed on the surfaces in a stable fashion, modifying the frictional characteristics thereof. They are transferred and bonded to the surface by chemical bonding, which gives rise to a high level of resistance to wear and an improvement in the frictional properties. Depending on the nature of the solids, this imparts to the surfaces an anti-wear protection, resistance and anti-wear properties at the extreme pressures generated by high surface-load stresses referred to as Hertzian stresses, and a low coefficient of friction over a wide range of loads and frictional speeds. Said properties for generating a transfer film effect or a leafing effect are used for the types of friction where the surfaces are repeatedly subjected to stressing, such as that produced during makeup and breakout of systems of tubular threaded joints.

Third Frictional Body

The third frictional body is the substance which is interposed between two surfaces which are in contact during friction.

In the absence of lubricant, two bodies which are in relative friction and under stress produce a third body formed by the debris, transformed chemically or non-chemically, from each of the bodies. That third body defines a part of the frictional properties by its behaviour under applied stress, its transformation mechanism under stress, its capacity to migrate, to be fixed or to be eliminated.

When a liquid, fluid or plastic solid lubricant which, that is to say which experiences deformation under shearing in a plastic mode with material flow, is interposed between the two bodies the lubricant forms a film separating the surfaces of the two bodies and itself constitutes a third body. Its composition is modified in the boundary conditions, that is to say when the frictional stresses culminate in contact between the lubricated materials, with the production of solids which are mixed with the fluid or plastic lubricant.

Extreme-Pressure Properties

These are the properties of certain products permitting the surfaces which are subjected to very high Hertzian stresses to withstand wear and to slide with low coefficients of friction.

Hertzian Stress or Hertzian Pressure

The surfaces in contact under a load stress are elastically deformed, defining a contact zone of a certain area. The load applied divided by that area defines the Hertzian pressure or stress. During high Hertz pressure, solid non-plastic materials can undergo internal shearing effects, reducing their service life due to fatigue of the material, while solid plastic materials undergo that shearing effect without structural degradation.

Matrix

This term is used to mean a system which makes it possible to fix or carry an active principle to a given location. It also serves as a cohesion agent for a heterogenous system and can have functions which complete those of the active principles that it bonds or carries.

The solid matrix of the invention is in particular lubricating and has a rheological behaviour of the plastic or viscoplastic type.

Synergy

Bodies having base properties can be combined into a complex body with totally different characteristics and behaviour. In the case where such behaviours lead to performances which are superior to the combination of those of the constituents, that is referred to as synergy.

Viscosity, Plasticity, Viscoplasticity, Granular Behaviour

There are bodies which are highly deformable or fluid and which undergo finite deformation under the effect of a hydrostatic pressure, and an indefinite flow under the effect of a shearing stress, even if slight. These are for example oils and greases.

There are bodies which are non-deformable or solid and which undergo finite deformation irrespective of the nature of the stress, at least up to a certain stress threshold. That is the case with thermosetting systems having yield strength, beyond which structural degradation of the material takes place.

There are materials (the most common) which are between those two extremes (materials with elastic, plastic, viscous and viscoplastic behaviour).

The third body generated or present in a frictional situation owes its lubricating or non-lubricating properties to its physical state in accordance with Table 1 hereinafter.

The materials used in the matrix according to the invention belong to category 1 in Table 1.

TABLE 1

| | Category | | |
|---|---|---|---|
| | 1 | 2 | 3 |
| Physical state of the third body | Plastic solid | Granular solid | Fluid |
| Description of the behaviour | Viscoplastic flow | Frictional-collisional state | Frictional-viscous behaviour |
| Effect | Lubricant | Non-lubricant | Lubricant |

Thermoplastic and Thermosetting Polymers

The solid matrix of the invention comprises at least one thermoplastic polymer.

The term thermoplastic qualifies a fusible polymer capable of being reversibly softened and then melted by heating respectively to the temperatures $T_g$ and $T_m$ (glass transition point and melting temperature) and solidified by cooling. Thermoplastic polymers are transformed without chemical reaction. Thermoplastic polymers are used in the invention in order to achieve a viscous flow, under frictional stress, while statically preserving a structure which is solid and dry (non-sticky to the touch) and stable. In contrast, in general terms, thermosetting polymers have no or little viscous behaviour under stress.

Metallic Soap

This term embraces soaps of alkali and alkaline-earth metals and other metals. These are fusible compounds having capacities of flow between surfaces (category 1 in Table 1).

Wax

This term covers fusible substances having lubricating properties, of various origins (mineral, in particular resulting from the distillation of petroleum, vegetable, animal or synthetic), with a more or less pasty or hard consistency and with a melting temperature and dropping point which can vary widely depending on their nature.

Corrosion Inhibitors

These are additives which impart to a liquid or solid material applied to a surface, the capacity for protecting that surface from different forms of corrosion. These corrosion inhibitors operate in accordance with various chemical, electrochemical or physico-chemical mechanisms.

Solid Lubricants

A solid lubricant is a solid stable body which, being interposed between two surfaces in friction, makes it possible to lower the coefficient of friction and to reduce wear and damage to the surfaces.

Those bodies can be classified in different categories defined by their operating mechanism and their structure. Those categories are for example described in the course documents entitled "Solid lubricants" conducted by Mr Eric Gard at Ecole Nationale Supérieure des Pétroles et Moteurs (France).

Class 1: solid bodies owing their lubricating properties to their crystalline structure, for example graphite, boron nitride BN, zinc oxide ZnO.

Class 2: solid bodies owing their lubricating properties on the one hand to their crystalline structure and on the other hand to a reactive chemical element of their composition, for example molybdenum disulphide $MoS_2$, graphite fluoride, tin sulphides and bismuth sulphides.

Class 3: solid bodies owing their lubricating properties to their chemical reactivity, for example certain chemical compounds of thiosulphates type (for example Desilube 88 marketed by Desilube Technology Inc.).

Class 4: solid bodies owing their lubricating properties to a plastic or viscoplastic behaviour under frictional stress, for example polytetrafluoroethylene PTFE and polyamides.

In order to achieve good levels of performance in terms of friction and solid lubricant transfer film constitution, the invention uses particles of solid lubricants belonging to one of the foregoing classes.

The inventors preferably used as solid lubricants compounds of class 2 and in particular compounds which have been little used hitherto such as graphite fluorides and complex tin or bismuth sulphides. According to the inventors those compounds differ from the traditional solid lubricating products such as graphite, molybdenum disulphide or tungsten disulphide because of their greater capacity for bonding to metals and their levels of performance at extreme pressures which are markedly greater.

The inventors in particular sought solutions which do not involve graphite which is capable of facilitating the occurrence of corrosion or molybdenum disulphide, that compound being known to be unstable in particular in the presence of moisture and to give off sulphur oxide which is corrosive for steel or hydrogen sulphide which possibly makes steel sensitive to deferred hydrogen-induced stress rupture (sulphide stress cracking or SSC).

Fullerenes

These are molecular materials having a structure in the form of closed or open tubes or closed or open spheres, of a single-layer or multi-layer nature. Spherical fullerenes are of a size of some tens of nm in the case of the mono-layer form and greater than about 80 nm in the multi-layer form. They act on surfaces by stably blocking the sites created by the surface roughnesses and blocking deteriorations of flaking type.

Types of Stresses

The invention takes account of the different stresses to which the tubular threaded joints are subjected in operation thereof.

Frictions at low and High Speeds, low and High Hertzian Stresses

The frictional system during makeup and breakout of the threaded joints is made complex by the great variety in frictional speeds which is encountered. In fact the speeds can be relatively high during makeup and nearly zero at the end of makeup or the beginning of breakout.

On the other hand the Hertzian stresses are very substantial in the same frictional periods, leading to limit conditions. The inventors have therefore tried to define a system which responds to those stresses.

To resolve the problems due to kinetic stresses the inventors developed a matrix whose properties involve a plastic characteristic leading to a viscous flow under stress and complying with all the speed situations which are encountered. The use of a plurality of constituents is necessary for the highest-performance systems in order to adapt them to that great variety of shearing effects. That matrix makes it possible to hold the other active elements in place and contribute to the production of stable transfer films or leaves.

Thermoplastic resins generally having plastic characteristics have been selected and the inventors gave the preference to polyethylene among all of the existing viscoplastic polymers, in preference to other viscoplastic polymers such as polyamide-6, polyamide-11 and polypropylene which give rise to problems of application because of their high viscosity in the molten state. Among the qualities of polyethylene the choice was for those having melting points of higher than 105° C.

To block the debris resulting from friction on the surface and thus to eliminate the possibilities of causing environmental pollution the invention further provides debris re-agglomeration means capable of re-agglomerating the debris resulting from frictional phenomena at the level of the contact surface of the threaded elements. Those re-agglomeration means make it possible to re-agglomerate the debris as soon as it is formed.

The inventors found in particular that certain metallic soaps, certain waxes and certain polymers can be used as re-agglomeration means.

The inventors in particular found by experiment that improvement in the properties in terms of re-agglomeration of debris and plasticity of the matrix is achieved by the addition of re-agglomeration means of metallic soap type, among which soaps of calcium, bismuth and zinc gave excellent results in terms of the number of makeup and breakout operations under the above-described site conditions. Among those soaps zinc stearate was selected for its intervention in synergistic relationship with the corrosion inhibitors studied hereinbefore.

Incorporation into the matrix of natural fatty substances such as carnauba wax also makes it possible to optimise the properties of re-agglomeration of debris in makeup-breakout operations.

In order to comply under quasi-static conditions with the limit lubrication stresses with the combination of very high frictional loads, the inventors prepared a suitable system of additives, comprising a solid lubricant formed by particles dispersed in a solid matrix. The conventional EP additives (EP=extreme pressure), for example based on sulphur compounds of the kind described in EP 1 313 827 operate only when the surface forces involved permit them to react, which occurs only in certain ranges of load and frictional speed. The inventors preferred to employ solid lubricants capable of guaranteeing a lubricated operating state even in a quasi-static condition.

The inventors in particular used one or more solid lubricants in class 2.

Hostile Environment (Moisture which may or may not be Saline)

Depending on the surface anti-corrosion protection requirements it may be necessary to incorporate corrosion inhibitors into the matrix. Among such inhibitors, derivatives of calcium sulphonates and more particularly those arising out of the association of calcium oxide and calcium sulphonates in a medium formed by waxes, petroleum resins or paraffins such as the product marketed by LUBRIZOL under the name ALOX 606 have shown themselves particularly performing, but other compounds can equally be used such as those of amino, aminoborate, quaternary amine, sulphonate super-alkalinised on polyalfaolefin, strontium phosphosilicate, zinc phosphosilicate and borate carboxylate type.

Resistance to corrosion can be further improved by associating the selected corrosion inhibitor with compounds acting in accordance with other mechanisms for blocking corrosion. As indicated hereinbefore zinc stearate in particular presents synergistic properties with corrosion inhibitors while greatly contributing to the lubricating behaviour of the matrix.

The main test of anti-corrosion protection is the saline mist test carried out in accordance with the standard ISO 9227 and evaluated by the index Re in accordance with ISO EN 2846-3 on a plate treated by phosphatation with manganese (deposit of 8 to 20 g/m$^2$ of phosphate).

Use in a Protected Environment (Constraints of Compatibility with the Environment)

The composition of the matrix is provided for blocking the debris resulting from friction on the surface in order to eliminate the possibilities of environmental pollution. Thanks to the appropriate composition of the matrix such debris is re-agglomerated as soon as it is formed.

In order to demonstrate that property the inventors included in the experimental protocols procedures involving quantitative measurement by weighing of the debris generated during friction. They were thus able to note the efficiency of the re-agglomeration means of metallic soaps and waxes type.

However, according to the compositions under study, an inadequacy of performance in terms of re-agglomeration led to a search for other types of product with a re-agglomerating function. Thus they considered the influence of highly viscous polymers such as alkyl polymethacrylates (PAMA), polybutenes, polyisobutenes and polysiloxanes, with excellent results in the debris re-agglomeration test being obtained with a PAMA of a kinematic viscosity of 850 mm$^2$/s at 100° C. marketed by ROHMAX under the name VISCOPLEX 6-950.

Examination after makeup and breakout cycles of two threadings provided with a coating according to the invention of which only one contains a PAMA shows that, with that coating, the debris produced by friction is agglomerated and incorporated on the frictional surface without causing external pollution while with the other coating the debris remains dispersed.

Applicability of the Coating

In order to improve the bond and the appearance of the coating at ambient temperature it may be necessary to add at least one surface-active agent to the matrix.

Thus the inventors more especially envisaged the addition of 2% or less of surface-active silicone, preferably polydimethylsiloxane, or DC56 (marketed by DOW CORNING).

Other compounds, which may or may not be polymers, having similar surface-activity properties, may also be considered.

The invention thus associates two groups of products, with systematic utilisation of the synergistic interactions between them:
the constituents of the matrix, and
a solid lubricant or lubricants of the same class.

The process according to the invention comprises a surface preparation of the elements to be lubricated.

Makeup and breakout tests have demonstrated that, in order to achieve the establishment of a correct transfer film, it was necessary to modify the surface to be coated either by a mechanical treatment such as sand blasting or shot blasting, or by a physical or chemical modification of the surfaces by means of a reactive treatment based on mineral deposits in crystallised form at the surface, a chemical attack for example by an acid, a phosphatation treatment using zinc or manganese or an oxalatation treatment leading to a chemical conversion layer at the surface. Among those surface treatments phosphatation is preferred as it makes it possible to produce a correct bonding surface leading to the production of a transfer film resisting during friction and very stable as well as a base anti-corrosion protection.

It may moreover be desirable to implement a complementary surface preparation operation involving in particular impregnating the porosity of the surface by nanomaterials, the size of which permits them to be inserted into the porosities. The object of that impregnation operation is to be block and saturate the sites created by the porosity by a material having a passivating action for protecting the surface from corrosion while preserving good adhesion for the coating.

Figure 2:
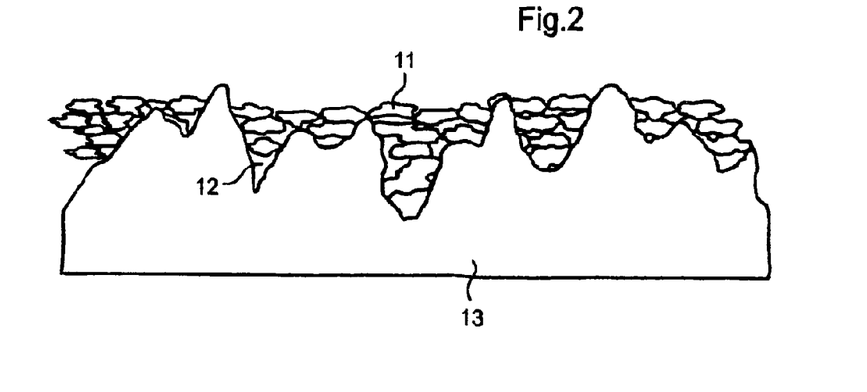
FIG. 2 shows on an enlarged scale a portion of the threading surface of a threaded element, the porosity of which is impregnated with nanomaterials according to the process of the invention, FIGS. 3 and 4 diagrammatically show devices which can be used for carrying out the process according to the invention, and FIG. 5 diagrammatically shows a device for evaluating the coating of the invention by a makeup and breakout test.

FIG. 2 diagrammatically shows the impregnation of particles 11 into the porosity sites 12 of a metallic substrate 13.

The inventors noted improvements in the level of performance in the saline mist test in accordance with the above-mentioned standards (increase by 20% in the time for corrosion to appear), by inserting particles of zinc oxide of nanometric size (200 nm on average), applied in a simple dispersion in water.

In order to permit visual identification of the treated surfaces it is possible to use any known organic colouring agents in proportions such that (for example 1%) they do not cause a deterioration in the frictional performances.

To preserve the coating from degradation by oxidation due for example to heat, one or more anti-oxidants may be added. Polyphenolic compounds, derivatives of naphthylamine and organic phosphites constitute the principal families of anti-oxidants. The inventors more particularly chose a combination of the products IRGANOX® L150 (system of polyphenolic and amino anti-oxidants) and IRGAFOS® 168 (tris(2, 4-di-tert-butylphenyl) phosphite) from Ciba-Geigy.

The invention also concerns modes of applying the coating, facilitating its industrialization. Different techniques are used for that purpose, those which appear most appropriate being described hereinafter.

The technique of spraying in the molten state involves keeping the product at high temperature in the liquid phase and spraying it by means of a thermostatically controlled spray gun. The product is heated at between 10 and 50° C. above its melting temperature and sprayed onto a temperature pre-heated to a temperature higher than the melting temperature in order to achieve good surface covering.

In a variant the spraying operation is carried out on a threaded element which is not pre-heated (that is to say which is maintained at ambient temperature). The composition of the coating is then adapted by the addition of a small amount of surface-active agent, for example 2% at maximum and preferably 0.6% to 1.0% of surface-active silicone, preferably polydimethylsiloxane or DC56 (marketed by DOW CORNING).

Figure 3:
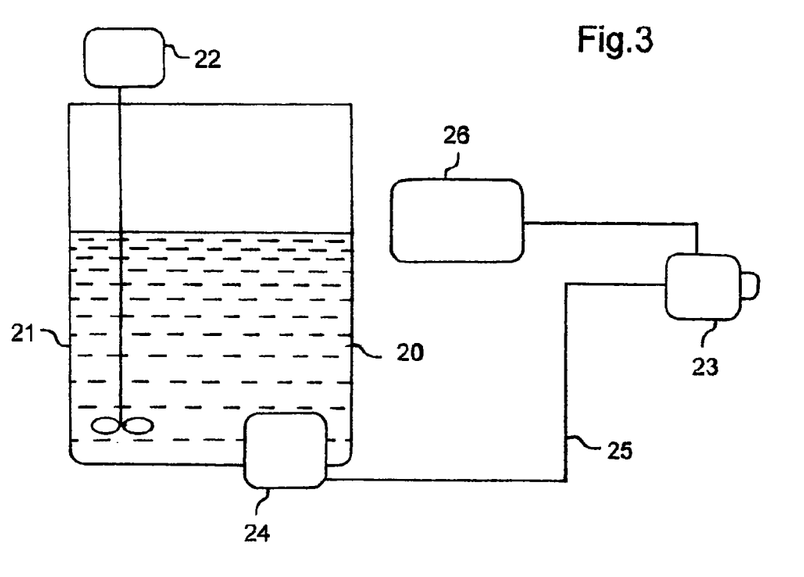

FIG. 3 shows an example of an installation for carrying out the process. The product 20 is melted in a vessel 21 stirring using a propeller stirrer 22 and then passed by a controllable-flow pump 24 through a pipe 25 to a spraying head 23 which is also supplied with air by a compressor 26. The components 21 and 23 to 26 are regulated as regards temperature.

Another technique is that of emulsion application in which the product is sprayed in the form of an aqueous emulsion. The emulsion and the substrate can be at ambient temperature, a drying time then being necessary. That drying time can be considerably reduced by pre-heating the product at between 60 and 80° C. and/or the surface at between 50 and 150° C.

Figure 4:
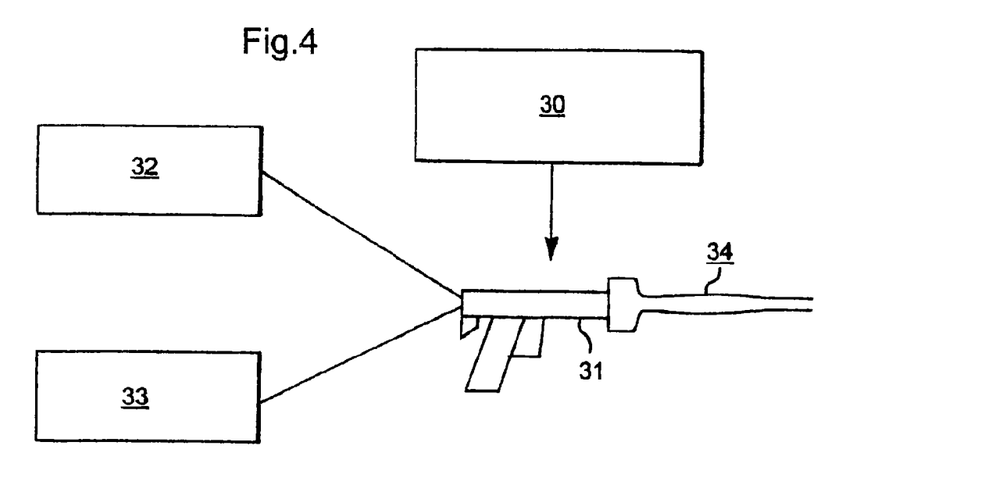

FIG. 4 illustrates the technique involved in thermal spraying or spraying through a flame. In this case the product 30 in powder form is projected onto the surface to be coated by means of a gun 31 supplied with air 32 and combustible gas 33. The powder melts on passing through the flame 34 and homogenously covers the target.

EXAMPLES

The examples involve a threaded joint of type VAM TOP HC of a nominal diameter of 177.8 mm (7 in) and of a linear mass of 43.15 kg/m (29 lb/ft) of low alloy steel (grade L80) in accordance with the technical specification edited by the OCTG division of Vallourec & Mannesmann Tubes.

Prior to application of the coating the male threaded element was subjected to phosphatation with zinc (weight of the layer was between 4 and 20 g/m$^2$) and the female threaded element was subjected to phosphatation with manganese (the weight of the layer was between 8 and 20 g/m$^2$). The threaded elements are preheated at 130° C. and thermal spraying is used to apply thereto a layer of a thickness of 35 μm of a product kept in the molten state at 150° C., of the composition by weight of one of Examples I to VI hereinafter in which:
the polyethylene is that marketed by CLARIANT under the name PE 520,
the carnauba wax is that marketed by NOVEON under the name LANCO 1955SF
the zinc stearate is that marketed by PETER GREVEN under the name LIGASTAB ZN70, the PAMA (alkyl polymethacrylate) is that marketed by ROHMAX under the name VISCOPLEX 6-950, the calcium sulphonate derivative is that marketed by LUBRIZOL under the name ALOX 606, the silicone (surface-active element) is that marketed by DOW CORNING under the name DC56; the silicone is in emulsion form, the anti-oxidants, on the one hand a mixture of aromatic amine and phenol and on the other hand phenyl phosphate, are those marketed by CIBA-GEIGY respectively under the names IRGANOX L150 and IRGAFOS 168.

the boron nitride is that marketed by ESK under the name BN, the zinc oxide is that marketed by SILAR S. A. under the name ZnO, the graphite fluoride is that marketed by ARC under the name CFx, the tin disulphide is that marketed by CHEMETALL under the name SnS2, the polytetrafluoroethylene is that marketed by SILAR S. A. under the name PTFE, and the polyamide-11 is that marketed by ARKEMA under the name RILSAN B.

Example I

Solid Lubricant of Class 1

| | |
|---|---|
| PE 520 | 9.0% |
| LANCO 1955SF | 15.0% |
| LIGASTAB ZN70 | 15.0% |
| VISCOPLEX 6-950 | 5.0% |
| DC56 | 1.0% |
| BN (solid lubricant class 1) | 10.0% |
| ALOX 606 | 44.5% |
| IRGANOX L150 | 0.3% |
| IRGAFOS 168 | 0.2% |

Example II

Solid Lubricant of Class 2

| | |
|---|---|
| PE 520 | 9.0% |
| LANCO 1955SF | 15.0% |
| LIGASTAB ZN70 | 15.0% |
| VISCOPLEX 6-950 | 5.0% |
| DC56 | 1.0% |
| CFx (solid lubricant class 2) | 10.0% |
| ALOX 606 | 44.5% |
| IRGANOX L150 | 0.3% |
| IRGAFOS 168 | 0.2% |

Example III

Solid Lubricant of Class 4

| | |
|---|---|
| PE 520 | 9.0% |
| LANCO 1955SF | 15.0% |
| LIGASTAB ZN70 | 15.0% |
| VISCOPLEX 6-950 | 5.0% |
| DC56 | 1.0% |
| PTFE (solid lubricant class 4) | 10.0% |
| ALOX 606 | 44.5% |
| IRGANOX L150 | 0.3% |
| IRGAFOS 168 | 0.2% |

Example IV

Synergistic Conjunction of two Solid Lubricants in Class 1

| | |
|---|---|
| PE 520 | 9.0% |
| LANCO 1955SF | 15.0% |
| LIGASTAB ZN70 | 15.0% |
| VISCOPLEX 6-950 | 5.0% |
| DC56 | 1.0% |
| BN (solid lubricant class 1) | 2.0% |
| ZnO (solid lubricant class 1) | 8.0% |
| ALOX 606 | 44.5% |
| IRGANOX L150 | 0.3% |
| IRGAFOS 168 | 0.2% |

Example V

Synergistic Conjunction of two Solid Lubricants in Class 2

| | |
|---|---|
| PE 520 | 9.0% |
| LANCO 1955SF | 15.0% |
| LIGASTAB ZN70 | 15.0% |
| VISCOPLEX 6-950 | 5.0% |
| DC56 | 1.0% |
| CF (solid lubricant class 2) | 2.0% |
| SnS2 (solid lubricant class 2) | 8.0% |
| ALOX 606 | 44.5% |
| IRGANOX L150 | 0.3% |
| IRGAFOS 168 | 0.2% |

Example VI

Synergistic Conjunction of two Solid Lubricants in Class 4

| | |
|---|---|
| PE 520 | 9.0% |
| LANCO 1955SF | 15.0% |
| LIGASTAB ZN70 | 15.0% |
| VISCOPLEX 6-950 | 5.0% |
| DC56 | 1.0% |
| RILSAN B (solid lubricant class 4) | 2.0% |
| PTFE (solid lubricant class 4) | 8.0% |
| ALOX 606 | 44.5% |
| IRGANOX L150 | 0.3% |
| IRGAFOS 168 | 0.2% |

Examples I to VI can be viewed as coatings whose composition by weight is in the following ranges:

| | |
|---|---|
| matrix | 70 to 95% |
| solid lubricants | 5 to 30% |

As regards the matrix it can be considered as being of a composition by weight in the following ranges:

| | |
|---|---|
| polyethylene homopolymer | 8 to 90% |
| carnauba wax | 5 to 30% |
| zinc stearate | 5 to 30% |
| derivative of calcium sulphonate | 0 to 50% |
| alkyl polymethacrylate | 0 to 15% |
| colouring agent | 0 to 1% |
| anti-oxidant | 0 to 1% |
| silicone (surface-active element) | 0 to 2% |

The silicone is preferably polydimethylsiloxane or DC56 (marketed by DOW CORNING).

Optionally the coating comprises molecules of at least one fullerene of spherical geometry.

In practice the thickness of the coating is generally between 10 μm and 50 μm.

The coating can also be applied to a sealing surface capable of coming into sealing tight contact with corresponding sealing surface of a second threaded element after assembly of the two threaded elements by makeup.

To simulate working conditions, a makeup and breakout test is carried out, in which the sleeve 40 (FIG. 5) comprising the female element is held vertically in the fixed jaw 41 of power tongs and the male element formed at the lower end of a short tube 42 referred to as the "pup joint" disposed vertically is pre-made up by hand into the female element.

Figure 5:
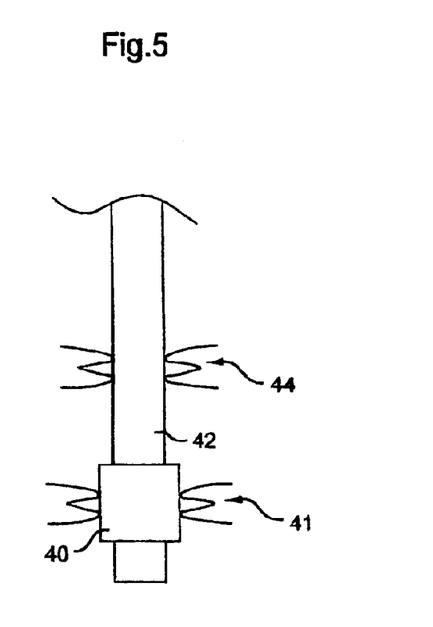

The male element is then engaged in the movable jaw 44 of the power tongs and made up into the female element at an initial rotary speed of 16 rpm and with a reduction in the speed in the final phase to zero upon the attainment of the nominal makeup torque for the non-coated threaded joint, which is 20 100 N·m in the example.

Breakout is carried out in a symmetrical manner, that is to say with an increasing rotary speed.

It was possible to carry out a plurality of makeup and breakout cycles under those conditions without a degradation of the constituent parts of the threaded elements.

The invention claimed is:

1. A process for finishing a tubular threaded element, comprising:
   applying only a single coating that is an antigalling coating in a form of a layer at least to a surface of a threading to produce a solid coating, and
   subjecting the surface to be coated to a surface treatment for improving adhesion of the coating,
   wherein constituents of the coating comprise a solid matrix and, in the matrix, a dispersion of particles of at least one solid lubricant, and
   wherein the solid matrix is lubricating and presents a rheological behaviour of plastic or viscoplastic type.

2. A process according to claim 1, wherein the constituents of the coating are raised to a temperature higher than a melting temperature of the matrix and then the coating is applied by spraying of the constituents comprising the matrix in a molten state.

3. A process according to claim 1, wherein the coating is applied by projection through a flame of a powder formed by the constituents of the coating.

4. A process according to claim 1, wherein the coating is applied by spraying an aqueous emulsion in which the constituents of the coating are dispersed.

5. A process according to claim 1, wherein the threaded element is raised to a temperature higher than or equal to 80° C.

6. A process according to claim 1, wherein the threaded element is at ambient temperature.

7. A process according to claim 1, wherein the surface treatment is selected from mechanical treatments, chemical treatments, and non-reactive deposits.

8. A process according to claim 1, wherein the surface to be coated is a metallic surface and the surface treatment is a treatment for chemical conversion of the surface.

9. A process according to claim 8, wherein the chemical conversion treatment is a phosphatation process.

10. A process according to claim 1, wherein the surface treatment is followed by a treatment for impregnation of roughness or porosities to the surface to be coated with nanomaterials with an anti-corrosion action.

11. A process according to claim 10, wherein the nanomaterials are particles of zinc oxide.

12. A process according to claim 10, wherein the nanomaterials are of a median particle size of the order of 200 nm.

13. A process according to claim 10, wherein the nanomaterials are applied in a form of a dispersion.

14. A process according to claim 1, wherein the dispersion of particles of at least one solid lubricant comprises particles of lubricant including:
   solid bodies having lubricating properties due to a crystalline structure of the solid bodies;
   solid bodies having lubricating properties due to a crystalline structure of the solid bodies and due to a reactive chemical element of a composition of the solid bodies;
   solid bodies having lubricating properties due to a chemical reactivity of the solid bodies; or
   solid bodies having lubricating properties due to a plastic or viscoplastic behaviour under frictional stress.

15. A process according to claim 1, wherein no separate corrosion protective coating is formed atop of the coating.

16. A process according to claim 1, wherein the solid matrix comprises at least one thermoplastic polymer, and is solidified by cooling.

17. A process according to claim 1, wherein the applying includes covering the surface of the threading homogeneously with the constituents of the coating.

* * * * *